United States Patent
Sussman et al.

(10) Patent No.: US 10,058,931 B2
(45) Date of Patent: Aug. 28, 2018

(54) NAIL HEAD REMOVAL TOOL

(71) Applicants: Jay L Sussman, Kalaheo, HI (US);
Timothy Pembrook, Lawai, HI (US)

(72) Inventors: Jay L Sussman, Kalaheo, HI (US);
Timothy Pembrook, Lawai, HI (US)

( * ) Notice: Subject to any disclaimer, the term of this patent is extended or adjusted under 35 U.S.C. 154(b) by 0 days.

(21) Appl. No.: 15/232,168

(22) Filed: Aug. 9, 2016

(65) Prior Publication Data

US 2017/0056982 A1   Mar. 2, 2017

Related U.S. Application Data

(60) Provisional application No. 62/209,539, filed on Aug. 25, 2015.

(51) Int. Cl.
| B23B 49/00 | (2006.01) |
| B23B 51/04 | (2006.01) |
| B23B 51/05 | (2006.01) |

(52) U.S. Cl.
CPC .......... *B23B 51/0413* (2013.01); *B23B 49/00* (2013.01); *B23B 51/0406* (2013.01); *B23B 51/05* (2013.01); *Y10T 408/559* (2015.01); *Y10T 408/895* (2015.01); *Y10T 408/9093* (2015.01)

(58) Field of Classification Search
CPC ............. Y10T 408/893; Y10T 408/895; Y10T 408/8953; Y10T 408/8957; Y10T 408/9093; Y10T 408/905; Y10T 408/906; Y10T 408/9065; B23B 51/04; B23B 51/00; B23B 51/05; B23B 51/0406; B27G 15/00; B21J 15/60
USPC .................................................. 81/53.2, 441
See application file for complete search history.

(56) References Cited

U.S. PATENT DOCUMENTS

| 385,133 | A | * | 6/1888 | Perkins | ................. | B23B 51/104 |
| | | | | | | 408/112 |
| 391,038 | A | * | 10/1888 | Evans | .................. | B23B 51/123 |
| | | | | | | 279/103 |
| 503,225 | A | * | 8/1893 | Adams | .................. | B27G 15/00 |
| | | | | | | 144/219 |

(Continued)

FOREIGN PATENT DOCUMENTS

| DE | 19545084 C1 | * | 7/1997 | ......... B23B 51/0426 |
| EP | 0870561 A1 | * | 10/1998 | ......... B23B 51/0413 |

(Continued)

OTHER PUBLICATIONS

JP 9-103906 Machine Translation, pp. 3-5, Aug. 7, 2017.*

*Primary Examiner* — Nicole N Ramos
(74) *Attorney, Agent, or Firm* — Morland C. Fischer

(57) ABSTRACT

A nail head removal tool is disclosed to be rotated by an electric drill to cut off the rusted head of a nail that has been driven into a wooden surface. The nail head removal tool includes an outer cutting body having a cylindrical cutting end with a plurality of cutting teeth extending therearound. An inner cutting insert is press fit into an insert cavity formed in the cylindrical cutting end of the outer cutting body. The inner cutting insert has a pair of cutting blades spaced from one another and standing upwardly from a cutting head of the insert. When a rotational force is applied to the tool, the cutting teeth at the cutting end of the outer cutting body cut into the surface around the nail, and the cutting blades at the cutting had of the inner cutting insert cut off and pulverize the rusted nail head.

9 Claims, 4 Drawing Sheets

(56) References Cited

U.S. PATENT DOCUMENTS

| | | | | |
|---|---|---|---|---|
| 928,749 | A * | 7/1909 | Goodwin | B23B 51/123 279/103 |
| 945,368 | A * | 1/1910 | Bocorselski | B23B 51/123 279/103 |
| 1,023,002 | A * | 4/1912 | Bennet | B21J 15/50 408/112 |
| 2,294,969 | A * | 9/1942 | Engvall | B23B 51/02 408/224 |
| 2,296,087 | A * | 9/1942 | Burns, Jr. | B21J 15/50 408/81 |
| 2,375,112 | A * | 5/1945 | Kanihan | B23B 47/284 408/112 |
| 2,576,786 | A * | 11/1951 | Gray | B23B 47/284 408/112 |
| 2,891,429 | A * | 6/1959 | Tragge | B23B 51/048 408/146 |
| 3,015,240 | A * | 1/1962 | Hodnett | B23B 47/284 408/112 |
| 3,106,233 | A * | 10/1963 | Wolny | B25B 27/18 29/426.5 |
| 3,546,980 | A * | 12/1970 | Lemanski | B23B 51/0433 408/147 |
| 3,620,635 | A * | 11/1971 | DalBianco | B23B 47/284 29/426.4 |
| 4,456,010 | A * | 6/1984 | Reimels | A61B 17/1695 408/139 |
| 4,930,946 | A * | 6/1990 | Phillips, Sr. | B23B 5/167 408/211 |
| 5,228,811 | A * | 7/1993 | Potter | B23B 47/284 408/112 |
| 5,318,390 | A * | 6/1994 | DalBianco | B21J 15/50 408/84 |
| 6,203,253 | B1 * | 3/2001 | Perrault | B23B 47/284 408/202 |
| 6,769,845 | B2 | 8/2004 | Estes | |
| 2015/0007701 | A1 * | 1/2015 | Siegel | B23B 33/005 82/150 |

FOREIGN PATENT DOCUMENTS

| | | | | |
|---|---|---|---|---|
| JP | 08243823 A | * | 9/1996 | B23B 51/0406 |
| JP | 09103906 A | * | 4/1997 | |
| JP | 2003225819 A | * | 8/2003 | |
| WO | WO 8910815 A1 | * | 11/1989 | B23B 51/0426 |

* cited by examiner

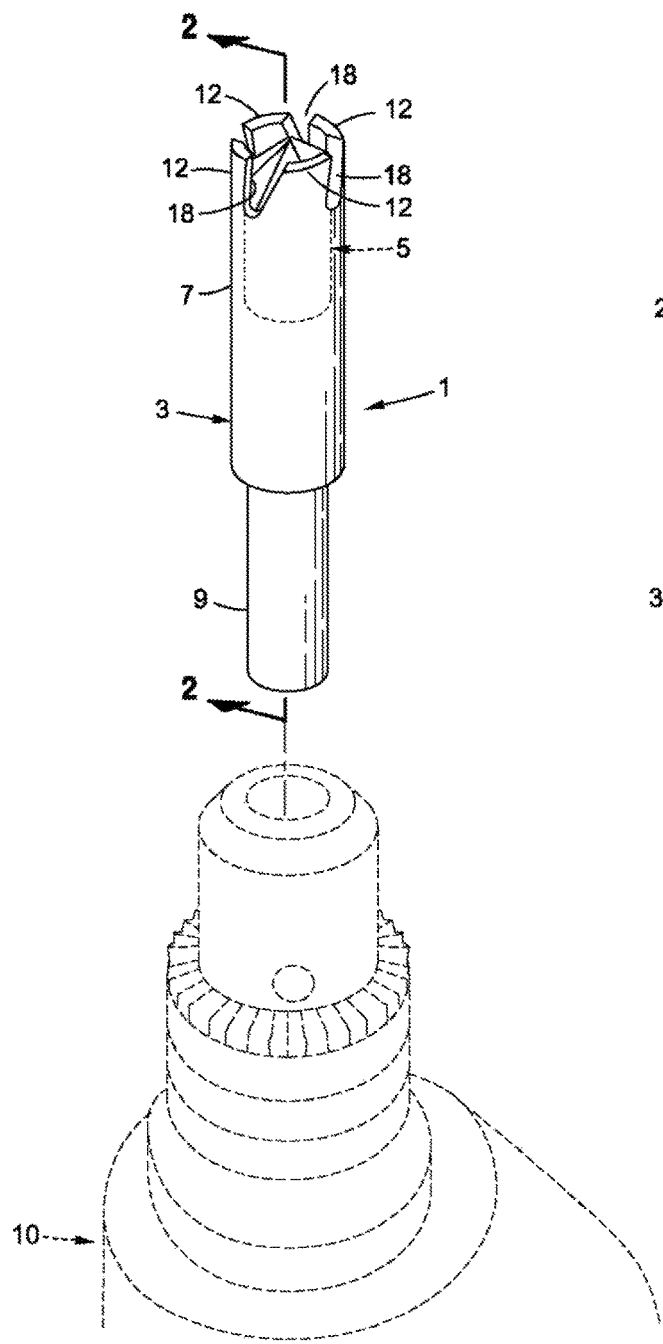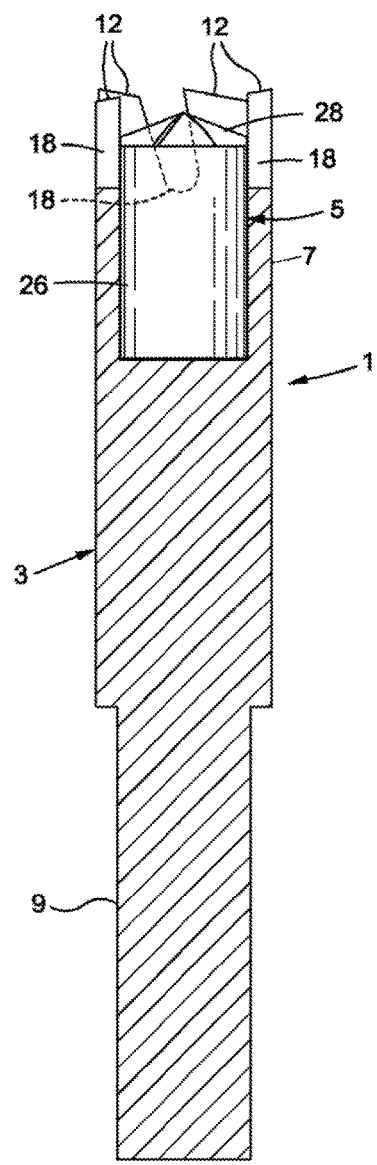
FIG. 1
FIG. 2

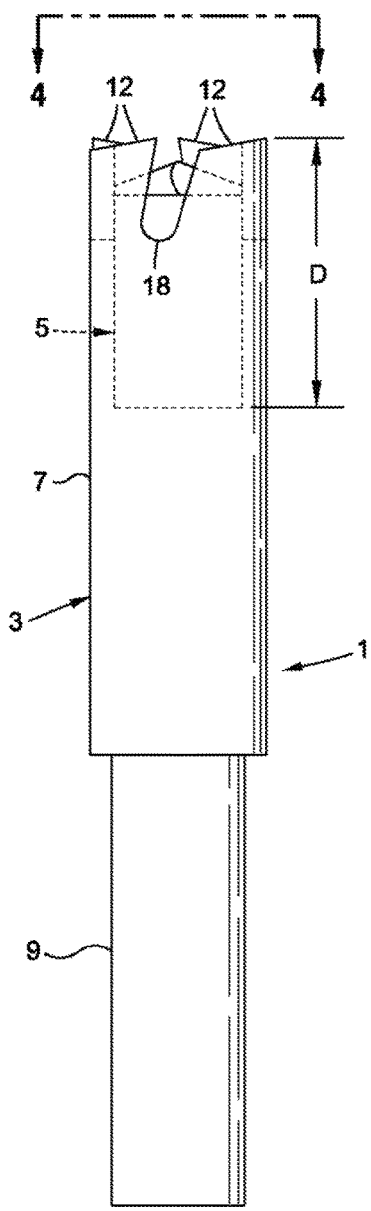
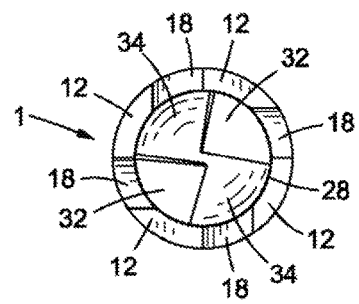
FIG. 4
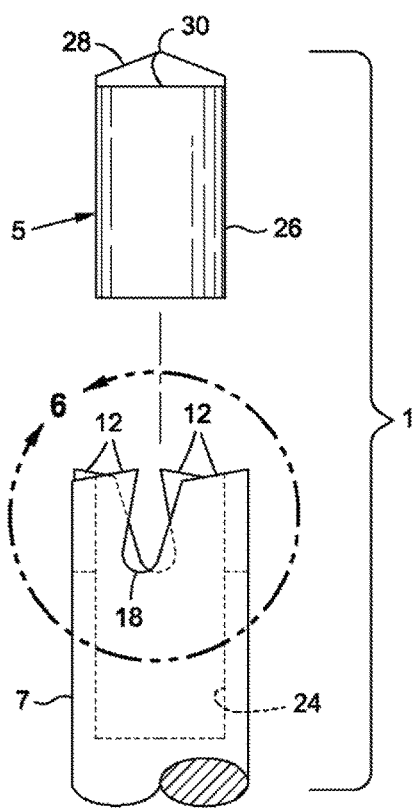
FIG. 3
FIG. 5

NAIL HEAD REMOVAL TOOL

CROSS-REFERENCE TO RELATED APPLICATIONS

This application is related to Provisional Patent Application No. 62/209,539 filed Aug. 25, 2015.

BACKGROUND OF THE INVENTION

1. Field of the Invention

This invention relates to a nail head removal tool that is coupled to and rotated by an electric drill to cut off the rusted head of a fastener (e.g., a nail) that has been driven into a (e.g., wooden) surface. The nail head removal tool has a cylindrical outer cutting body and a coaxially abated inner cutting insert that cooperate to grind and pulverize the rusted nail head while, at the same time cutting a counter bore into the surface which can be patched and painted.

2. Background Art

Nails are commonly used as fasteners in wooden frames, siding trim and decking. Over time, and alter being subjected to moisture, the nail head is known to rust and bleed through the paint or other treatment which covers the nail. Consequently, an unsightly rust stain becomes visible to passersby. Although the rusted nail head can be sanded and painted over, a new rust stain is likely to appear through the paint in a few years. An alternate solution has been for painters and homeowners to use the claws of a hammer or a similar claw nail puller to engage the head and pull the nail outwardly from the surface into which the nail was driven. Because the rusted nail head is typically brittle and embedded slightly below the surface, the nail head is often hard to rip which results in a time consuming removal process and possible damage to the surface from which the nail has been removed.

Accordingly, what would be desirable is an efficient tool by which to be able to quickly and easily remove the rusted head of a nail without damaging the (wood) surface within which the nail is driven.

SUMMARY OF THE INVENTION

In general terms, a nail head removal tool is disclosed to be coupled to the chuck of a conventional electric drill by which to be rotated by the drill in order to cut off the rusty head of a nail or similar fastener that had been hammered into a (wooden) surface. The nail, head removal tool includes an outer cutting body having a cylindrical cutting end and a drill coupling end lying opposite the cutting end to be coupled to the chuck of the drill. A plurality of upsloping cutting teeth which are uniformly spaced around the cutting end are separated from one another by radiused slots which permit wood and metal debris to exit the tool to avoid clogging. Pressed into an insert cavity formed in the cutting end of the outer cutting body of the nail head removal tool is an inner cutting insert. The inner cutting insert includes a solid cylindrical body which is coaxially aligned with the cylindrical cutting end of the outer cutting body. Located on top of the cylindrical body of the inner cutting insert is a cutting head at which a pair of opposing nail head shaving blades slope upwardly towards a point. The cutting head of the inner cutting insert is surrounded by and recessed below the cutting teeth at the cutting end of the outer cutting body.

When the drill is operated and a rotational force is applied to the nail head removal tool, the cutting teeth at the cutting end of the outer cutting body of the tool encircle the rusted nail head and cut into the surface into which the nail has been driven. The upsloping nail head shaving blades at the cutting head of the inner cutting insert are then advanced into contact with and grind and pulverize the rusted nail head. Once the nail head has been removed, the drill and the nail head removal tool carried thereby are withdrawn leaving a counter bore formed in the surface where the nail head was previously embedded. The counter bore may now be filled in and painted over so that any trace of the former rusted nail head is removed from the surface.

BRIEF DESCRIPTION OF THE DRAWINGS

FIG. 1 is an exploded perspective view showing a nail head removal tool according to a preferred embodiment of this invention being coupled to the chuck of an electric drill;

FIG. 2 is a cross section of the nail heat removal tool taken along lines 2-2 of FIG. 1;

FIG. 3 is an enlarged side view of the nail head removal tool shown in FIG. 1;

FIG. 4 is a top view of the nail head removal tool taken along the directional lines 4-4 of FIG. 3;

FIG. 5 is an exploded view showing an inner cutting insert being moved to mating engagement with and surrounded by a cutting end of an outer cutting body of the nail bead removal tool;

DESCRIPTION OF THE PREFERRED EMBODIMENT

Figure 6:
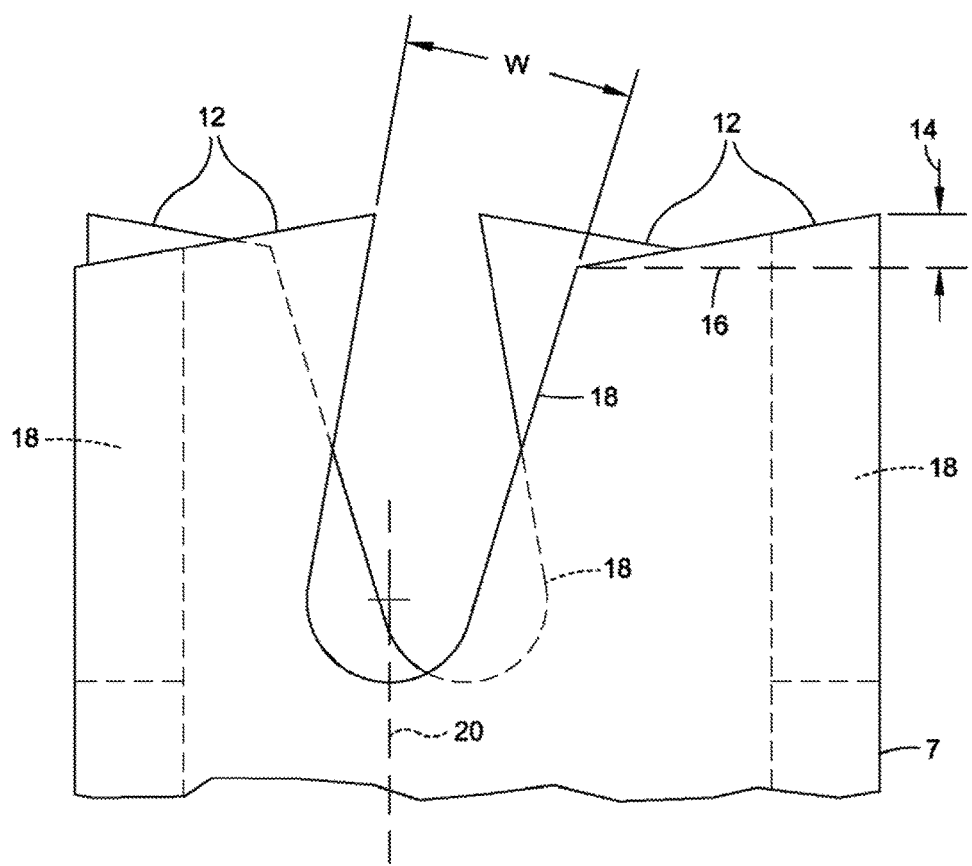
FIG. 6 is an enlarged detail of the cutting end of the outer cutting body taken from FIG. 5.

A preferred embodiment for nail head removal tool 1 is initially described while referring concurrently to FIGS. 1-6 of the drawings. The nail head removal tool 1 herein disclosed has particular application for use by a homeowner or a painter to remove a nail head, especially one that has rusted and/or is hard to grip by the claws of a hammer, from a wooden or any surface in which a nail has been driven. That is, and as will be disclosed in greater detail hereinafter, the nail head removal tool 1 is adapted to slice off the head of a rusted nail whereby the surface within which the body of the nail remains embedded can be repaired (i.e., patched) and painted over so that no trace of the former nail head will be visible to onlookers. However, it is to be understood that the nail head removal tool 1 of this invention can also be used to remove the heads of clean nails as well as the rusted heads of other fasteners besides a nail.

The nail head removal tool includes an outer cutting body 3 that is located in surrounding mating engagement with a coaxially aligned inner cutting insert 5. The outer cutting body of tool 1 has a cylindrical upper cutting end 7 and a cylindrical lower drill coupling end 9. By way of example only, the outer cutting body 3 of tool 1 has a length of three inches. The diameter of the cylindrical lower drill coupling end 9 of tool 1 is smaller than the diameter of the cylindrical upper cutting end 7, so that the lower end 9 functions as a shank to lit into the chuck of a conventional electric drill 10 (best shown in FIG. 1).

The outer cutting body 3 of the nail head removal tool 1 is preferably manufactured from hardened (e.g., M2 tool) steel. The top of the upper cutting end 7 of cutting body 3 has a plurality of (e.g., four) teeth 12 formed therein and spaced circumferentially from one another around the tool 1. As is best shown in FIG. 6, each tooth 12 stands upwardly and outwardly from the upper cutting end 7. Each tooth 12 slopes upwardly at a small angle 14 of about ten degrees relative to a horizontal reference line 16 of FIG. 6 so as to enhance the ability of the cutting end 7 to cut into the surface in which the nail has been driven. The plurality of teeth 12 are evenly spaced from each other by radiused slots 18. Each slot 18 has an ideal width (designated W in FIG. 6) of about 0.125 inches and an ideal depth of about 0.3 inches below the top of a pair of the teeth 12 lying side-by-side one another. Each slot 18 is preferably sloped to make a small angle of about ten degrees relative to a vertical reference line 20 of FIG. 6.

As is best shown in FIG. 5, the top of the upper cutting end 7 of the outer cutting body 3 of the nail head removal tool 1 has an insert cavity 24 formed therein. The insert cavity 24 has an ideal depth (designated D in FIG. 3) of about 0.75 inches below the top of the teeth 18 of the upper cutting end 7. The insert cavity 24 is sized to receive therewithin the inner cutting insert 5 so that the upper cutting end 7 of the outer cutting body 3 surrounds and embraces insert 5. The inner cutting insert 5 is preferably manufactured from a hardened (e.g., carbide) steel and is tightly press fit within the insert cavity 24 so as to be fixedly attached to and carried by the upper cutting end 7 of the cutting body 3 of the nail head removal tool 1.

As is best shown in FIGS. 3-5, the inner cutting insert 5 includes a solid cylindrical body 26 at one end thereof and a cutting head 28 at the opposite end. With the insert 5 pressed into engagement with the upper cutting end 7 of the outer cutting body 3, the cylindrical body 26 of insert 5 is received by the insert cavity 24 of the upper cutting end 7, and the cutting head 28 is recessed below and surrounded by the plurality of teeth 12 which stand upwardly and outwardly from the upper cutting end 7 of the outer cutting body 3.

Figure 7:
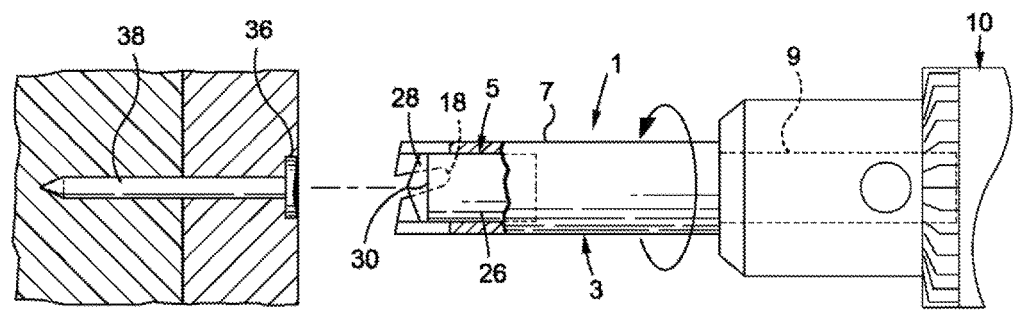
FIGS. 7-9 show the nail head removal tool being rotated by the electric drill of FIG. 1 and moved into contact with a rusted nail head and the surface within which the nail head is embedded so as to cut off and pulverize the nail head.
Figure 8:
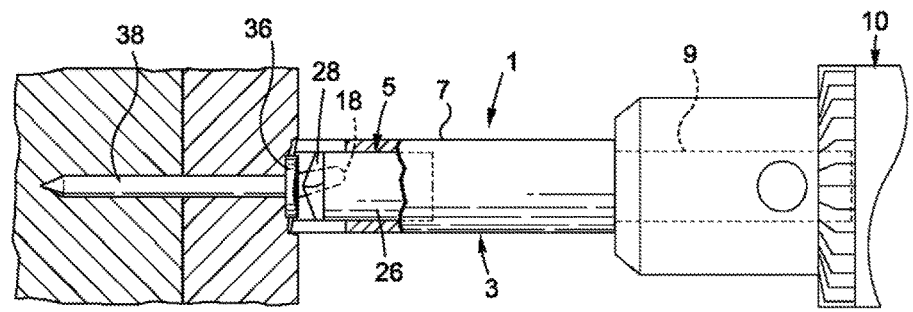
Figure 9:
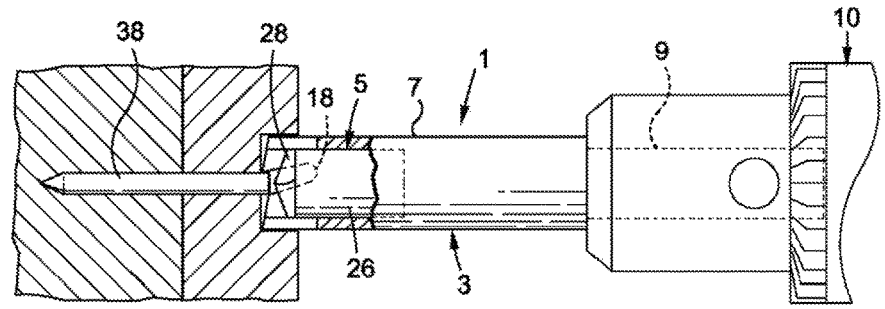

The cutting head 28 located at the top of the inner cutting insert 5 is especially adapted to slice and/or grind the metal heads from the embedded nails against which the nail head removal tool 1 is moved in the manner shown in FIGS. 7-9. With the cutting head 28 of the insert 5 recessed below the upper cutting end 7 and surrounded by the teeth 12 of the outer cutting body 3, the debris that is cut from the nail head and the wood into which the nail, is driven will be removed from the nail head removal tool 1 by way of the slots 18 which lie between successive teeth 12.

The cutting head 28 has a pair of nail head shaving blades 32 which lie opposite one another and are separated by grooves 34 that are formed in the cutting head. The blades 32 slope upwardly from the cylindrical body 26 of insert 5 towards a point (designated 30 in FIG. 5) that is located atop insert 5. The nail head shaving blades 32 of insert 5 and the teeth 12 at the upper cutting end 7 of the outer cutting body 3 slope upwardly in the same direction. Each nail head shaving blade 32 of cutting had 28 lies over the top of and covers about one quarter of the body 26 of insert 5. As is best shown in FIG. 4, the grooves 34 which separate the pair of nail head shaving blades 32 from one another at the cutting end 28 of the inner cutting insert 5 are aligned with opposing ones of the slots 18 which separate the teeth 12 of the upper cutting end 7 of the outer cutting body 3 to form continuous exit paths and thereby facilitate the escape of wood and metal debris so as to avoid clogging when the nail head removal tool 1 of this invention is used to remove the head of a rusted nail that is embedded within a wooden surface as will now be explained.

Referring in this regard to FIGS. 7-9 of the drawings, the nail head removal tool 1 is used in combination with the (e.g., cordless, battery powered) electric drill 10 shown in FIG. 1 to remove the head 36 of a nail 38 which has been driven into a surface and rusted, over time. Although the nail head removal tool 1 is primarily intended to remove, the heads of nails which are embedded in wooden surfaces, the type of surface into which the nail 38 has been driven is not be considered as a limitation of this invention. As previously explained, the nail head removal tool 1 is coupled to the drill 10 by inserting the lower drill coupling end 9 of the outer cutting body 3 of tool 1 into the chuck of drill 10 such that a rotation of the chuck is imparted to the upper cutting end 7 of the outer cutting body 3 as well as to the inner cutting insert 5 that is surrounded by and mated to the outer cutting body 3.

With the nail head removal tool 1 coupled to the drill 10, the tool 1 is moved towards the surface within which the nail 38 is embedded as shown in FIG. 7. The tool 1 is positioned such that the sloping teeth (designated 12 in FIGS. 5 and 6) at the upper cutting end 7 of the outer cutting body 3 encircle the nail head 36 to be removed. Because the cutting head 28 of the inner cutting insert 5 lies below the teeth 12 of the outer cutting body 3, the point 30 of the cutting head 28 atop the cylindrical body 26 of the inner cutting insert 5 is initially spaced from the nail head 36 as shown in FIG. 8.

When power is applied to the drill 10 and the nail head removal tool 1 is rotated, the teeth 12 at the upper cutting cud 7 of the outer cutting body 3 of tool 1 cut into the (e.g., wood) surface so that the nail head 36 is captured within cutting end 7. The hole created by the teeth 12 has a diameter which is larger than the diameter of the nail head 36. At the same time, the inner cutting insert 5 that is surrounded by and recessed within the upper cutting end 7 is advanced towards and into engagement with the rusted nail head 36. The inner cutting insert 5 is simultaneously rotated with the outer cutting body 3 of tool 1 so that the nail head shaving blades (designated 32 in FIG. 4) which stand upwardly at the cutting head 28 of insert 5 slice into and pulverize the rusted nail head as shown in FIG. 9. The wood and metal debris created by the cutting action of the teeth 12 of the outer cutting body 3 and the nail bead shaving blades 32 of the inner cutting insert 5 exit the upper cutting end 7 of the tool 1 at the slots 18 located between the teeth 12 as was previously explained.

Figure 10:
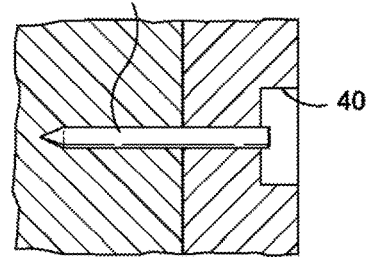
FIG. 10 shows a counter bore that is created in the surface once the rusted nail head that was formerly embedded in the surface is cut off and pulverized by the nail head removal tool.

Once the head of the nail 38 has been pulverized and removed, the nail head removal tool 1 carried by the drill 10 is withdrawn from the surface against which the nail head was embedded. In place of the former nail head, a counter bore 40 as shown in FIG. 10 is cut by tool 1 into the surface around the location of the former nail head. The counter bore 40, which is wider than the original nail head 36, can now be easily patched and painted over so that any trace of the former rusted nail head is removed from the surface.

The invention claimed is:
1. A tool to which a rotational force is applied, said tool being configured to remove a head of a headed fastener that is embedded within a wooden surface and surrounded by said wooden surface, said tool comprising:

an outer cutting body having a cylindrical cutting end, the cylindrical cutting end having an insert cavity formed therein and a plurality of cutting teeth spaced from one another and extending around said cylindrical cutting end so as to cut into the wooden surface surrounding the head of the headed fastener when the rotational force is applied to said tool; and an inner cutting insert surrounded by the cylindrical cutting end of said outer cutting body, said inner cutting insert having a plurality of cutting blades that are surrounded by the plurality of cutting teeth of the cylindrical cutting end of said outer cutting body so as to cut into and remove the head of the headed fastener when the rotational force is applied to said tool after said plurality of cutting teeth cut into the wooden surface surrounding the head of the headed fastener; said inner cutting insert being press fit within the insert cavity formed in the cylindrical cutting end of said outer cutting body so as to be fixedly attached to and carried by the cylindrical cutting end, said inner cutting insert being in flush engagement against and surrounded by the cylindrical cutting end of said outer cutting body and the plurality of cutting blades of said inner cutting insert are surrounded by the plurality of cutting teeth of said outer cutting body.

2. The tool recited in claim 1, wherein said inner cutting insert is surrounded by and coaxially aligned with the cylindrical cutting end of said outer cutting body, and wherein the plurality of cutting blades of said inner cutting insert are spaced from one another.

3. The tool recited in claim 1, wherein the plurality of cutting teeth which extend around the cylindrical cutting end of said outer cutting body are circumferentially separated from one another and slope upwardly in a same direction relative to a vertical reference line.

4. The tool recited in claim 1, wherein said inner cutting insert is surrounded by and recessed within said outer cutting body such that the plurality of cutting blades of said inner cutting insert lie below the plurality of cutting teeth which extend around the cylindrical cutting end of said outer cutting body.

5. The tool recited in claim 1, wherein the plurality of cutting blades of said inner cutting insert are spaced from one another.

6. The tool recited in claim 1, wherein the plurality of cutting blades of said inner cutting insert is at least one pair of cutting blades that lie opposite one another, and wherein each one of said pair of cutting blades has a sloped cutting surface, such that the respective sloped cutting surfaces of said pair of cutting blades slope upwardly so as to form a point.

7. The tool recited in claim 1, wherein successive ones of said plurality of cutting teeth which extend around the cylindrical cutting end of said outer cutting body are separated from one another by a slot therebetween, and successive ones of the plurality of cutting blades of said inner cutting insert are separated from one another by a groove therebetween, the slots of said outer cutting body being aligned with and located opposite respective grooves of said inner cutting insert to create exit paths therethrough by which debris that is cut by said outer cutting body and inner cutting insert is removed from said tool.

8. A combination comprising:
a drill; and
a tool to be coupled to said drill to receive a rotational force applied thereto by said drill, said tool being configured to remove a head of a headed fastener that is embedded within a wooden surface and surrounded by said wooden surface, said tool including an outer cutting body having a coupling end to be coupled to said drill and an opposite cylindrical cutting end configured to surround the head of the headed fastener to be removed, said cylindrical cutting end having an insert cavity formed therein and a plurality of cutting teeth spaced from one another and extending therearound so as to cut into the wooden surface surrounding the head of the headed fastener when the rotational force is applied to said tool; and an inner cutting insert being press fit within the insert cavity that is formed in the cylindrical cutting end of said outer cutting body so as to be fixedly attached to and carried by the cylindrical cutting end, said inner cutting insert being in flush engagement against and surrounded by and coaxially aligned with the cylindrical cutting end of said outer cutting body, said inner cutting insert having a plurality of cutting blades that are surrounded by the plurality of cutting teeth of said cylindrical cutting end and recessed within said outer cutting body so as to lie below said plurality of cutting teeth such that said plurality of cutting blades cut into and remove the head of the headed fastener when the rotational force is applied to said tool by said drill and said plurality of cutting teeth cut into the wooden surface surrounding the head of the headed fastener.

9. The tool recited in claim 8, wherein successive ones of said plurality of cutting teeth which extend around the cylindrical cutting end of the outer cutting body of said tool are separated from one another by a slot therebetween, and successive ones of the plurality of cutting blades of said inner cutting insert of said tool are separated from one another by a groove, the slots of said outer cutting body being aligned with and located opposite respective grooves of said inner cutting insert to create exit paths therethrough by which debris that is cut by said outer cutting body and inner cutting insert is removed from said tool.

* * * * *